United States Patent [19]
Kim

[11] Patent Number: 5,772,918
[45] Date of Patent: Jun. 30, 1998

[54] RED FLUORESCENT COMPOSITION FOR COLOR CATHODE-RAY TUBE

[75] Inventor: Dae Hwang Kim, Seoul, Rep. of Korea

[73] Assignee: LG Electronics Inc., Rep. of Korea

[21] Appl. No.: 880,312

[22] Filed: Jun. 24, 1997

Related U.S. Application Data

[63] Continuation of Ser. No. 602,529, Feb. 20, 1996, abandoned.

[30] Foreign Application Priority Data

Feb. 20, 1995 [KR] Rep. of Korea ..................... 1995-3225

[51] Int. Cl.$^6$ ....................................................... H01J 29/20
[52] U.S. Cl. ............................. 252/301.45; 252/301.4 R; 313/461; 313/467; 313/468
[58] Field of Search ................................. 313/461, 467, 313/468; 252/301.45, 301.4 R

[56] References Cited

U.S. PATENT DOCUMENTS

| | | | |
|---|---|---|---|
| 3,926,837 | 12/1975 | Graff | 252/301.4 S |
| 4,307,320 | 12/1981 | Kotera et al. | 313/474 |
| 4,420,444 | 12/1983 | Yamada et al. | 252/301.45 |
| 5,217,647 | 6/1993 | Tono et al. | 252/301.4 S |

FOREIGN PATENT DOCUMENTS

| | | | |
|---|---|---|---|
| 58-1776 | 1/1983 | Japan | 252/301.4 S |
| 58-212034 | 12/1983 | Japan | 313/467 |
| 60-74241 | 4/1985 | Japan | 313/467 |
| 3-220286 | 9/1991 | Japan | 252/301.4 S |

*Primary Examiner*—Melissa Bonner
*Attorney, Agent, or Firm*—Bell, Boyd & Lloyd

[57] ABSTRACT

An europium activated yttrium oxysulfide fluorescencer composition for color cathode-ray tube is disclosed, wherein a first red fluorescencer with predetermined particle size and a second red fluorescencer with smaller particle size are mixed and said first fluorescencer and second fluorescencer comprises respectively 0.07–0.08 g atomic weight of europium as an activator relative to 1 mole of yttrium oxysulfide as a mother body.

1 Claim, 2 Drawing Sheets

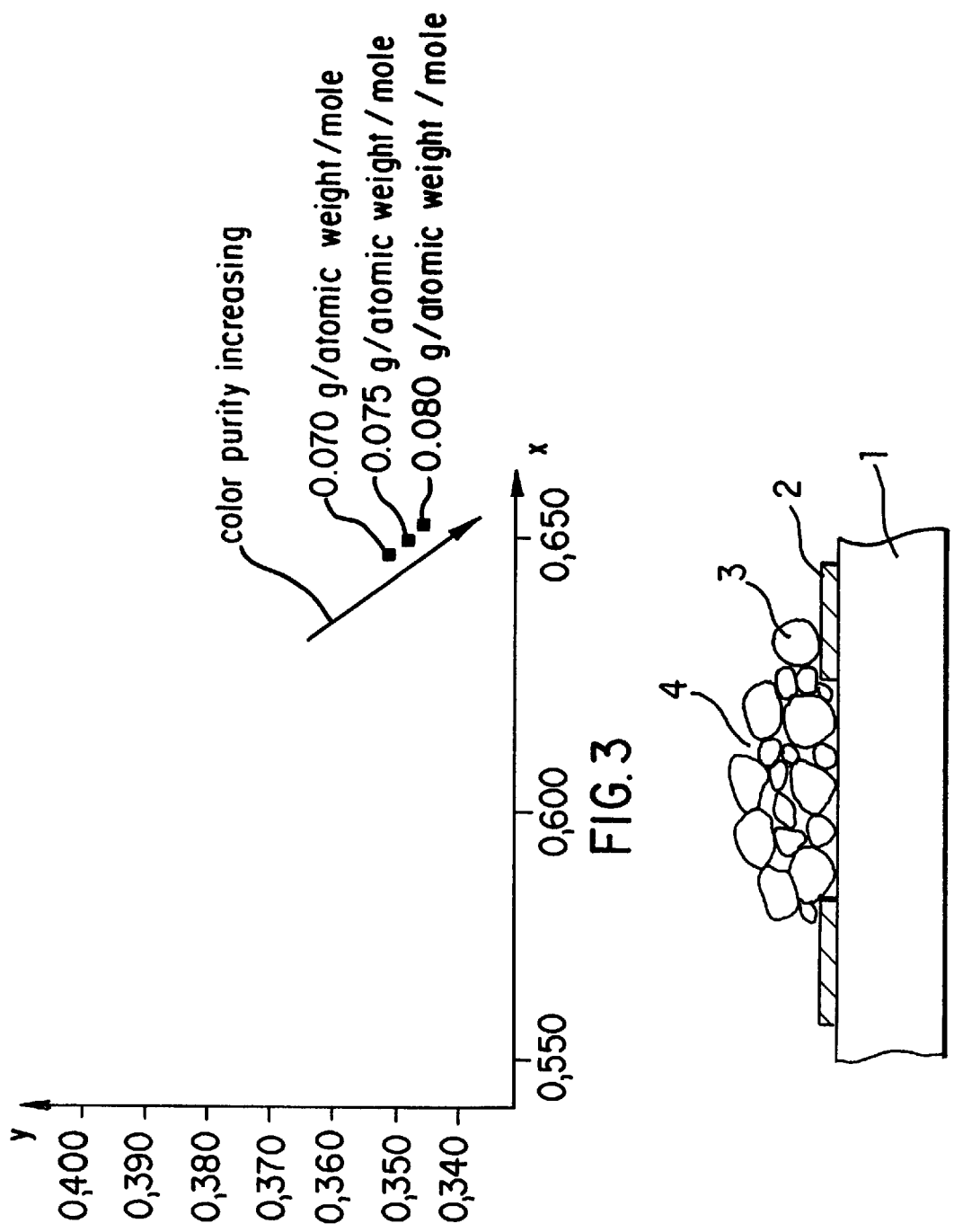

RED FLUORESCENT COMPOSITION FOR COLOR CATHODE-RAY TUBE

This is a continuation of application Ser. No. 08/602,529, filed on Feb. 20, 1996 now abandoned.

BACKGROUND OF THE INVENTION

1. Field of the Invention

The present invention relates to a red fluorescent composition for color cathode-ray tube. More particularly, the present invention relates to a red fluorescent compostion for color cathode-ray tube which enables to enlarge the range of color reproduction and at the same time to prevent the deterioration of relative luminous efficiency of a red fluorescent composition.

2. Background of the Invention

A method for preparing a fluorescent plane for color cathode-ray tube is diclosed in U.S. Pat. No. 4,307,320, wherein green and blue fluorescent bodies are applied on inner surface of panel on which black matrix is formed. After exposure to light, europium activated yttrium oxysulfide red fluorescent composition ($Y_2O_2S$:Eu) comprising 0.04–0.066 g atomic weight of europium as an activator relative to 1 mole of yttrium oxysulfide, is applied to the above panel formed and it is light-exposed to provide a screen plane for color cathode-ray tube.

However, there has been a problem that europium activated yttrium oxysulfide red fluorescent composition ($Y_2O_2S$:Eu) having above composition has deteriorated color purity caused by low x-coordinate value and high y-coordinate value on a C.I.E. chromaticity diagram and does not satisfy the range of color reproduction similar to natural color which has been required recently.

SUMMARY OF THE INVENTION

The present invention is intended to provide the red fluorescent composition for color cathode-ray tube, which enables to enlarge the range of color reproduction and at the same time to prevent the deterioration of relative luminous efficiency of red fluorescent by enhancing the color purity of europium activated yttrium oxysulfide red fluorescent composition.

The above object of the present invention has been achieved by europium activated yttrium oxysulfide red fluorescent composition ($Y_2O_2S$:Eu) for color cathode-ray tube wherein a first red fluorescent with predetermined particle size and a second red fluorescent with smaller particle size are mixed and the first fluorescent and the second fluorescent comprises respectively 0.07–0.08 g atomic weight of europium as an activator relative to 1 mole of yttrium oxysulfide as a mother body.

BRIEF DESCRIPTION OF THE DRAWINGS

FIG. 3 is a C.I.E. chromaticity diagram for the red fluorescent composition according to the present invention; and FIG. 4 is a cross-sectional view for the red fluorescent screen formed by the red fluorescent composition according to the present invention.

DETAILED DESCRIPTION OF THE INVENTION

According to the present invention, europium activated yttrium oxysulfide red fluorescent composition comprising 0.07–0.08 g atomic weight of europium as an activator relative to 1 mole of yttrium oxysulfide as a mother body, is applied on inner surface of panel, wherein green and blue fluorescent bodies are applied, and then it is light-exposed to form the fluorescent plane for color cathode-ray tube. The x- and y-coordinate values of europium activated yttrium oxysulfide red fluorescent composition ($Y_2O_2S$:Eu) on the chromaticity diagram will be changed dependent on the content proportion of yttrium oxysulfide as a mother body and europium as an activator. As shown in FIG. 3, in the red fluorescent composition according to the present invention, color point on the C.I.E. chromaticity diagram is X=0.645, Y=0.352 in case of 0.07 g atomic weight of europium content and X=0.651, Y=0.347 in case of 0.08 g atomic weight of europium content. Hence, as the content of europium is increased, x-coordinate value of the red fluorescent composition on the chromaticity diagram is increased and y-coordinate value is decreased and these result in enhancement of color purity and enlargement of the range of color reproduction towards natural color.

However, as shown in Table 1 described below, there has been a problem that relative luminous efficiency of the red fluorescent composition is lowered as the europium content is increased. At this time, relative luminous efficiency is a value based on light intensity emitting fluorescent light when light source with stabilized intensity is applied to a red fluorescent composition wherein particle size is 7–8 $\mu$m and Eu content is 0.070 g atomic weight.

To solve the problem, as shown in FIG. 4, the red fluorescent composition of the present invention comprising a first red fluorescent(3) with a particle size of 7–8 $\mu$m and a second red fluorescent(4) with a particle size of 3– 5 $\mu$m by mixing, is used to form a fluorescent screen on the black matrix(2) over panel(1) and this prevents the deterioration of relative luminous efficiency by enhancing the screen filling property.

TABLE 1

| Eu content | Relative luminous efficiency | Coordinate value on C.I.E. chromaticity diagram |
|---|---|---|
| 0.070 g atomic weight | 100% | x:0.645, y:0.352 |
| 0.075 g atomic weight | 92% | x:0.648, y:0.349 |
| 0.080 g atomic weight | 85% | x:0.651, y:0.347 |

Figure 2:
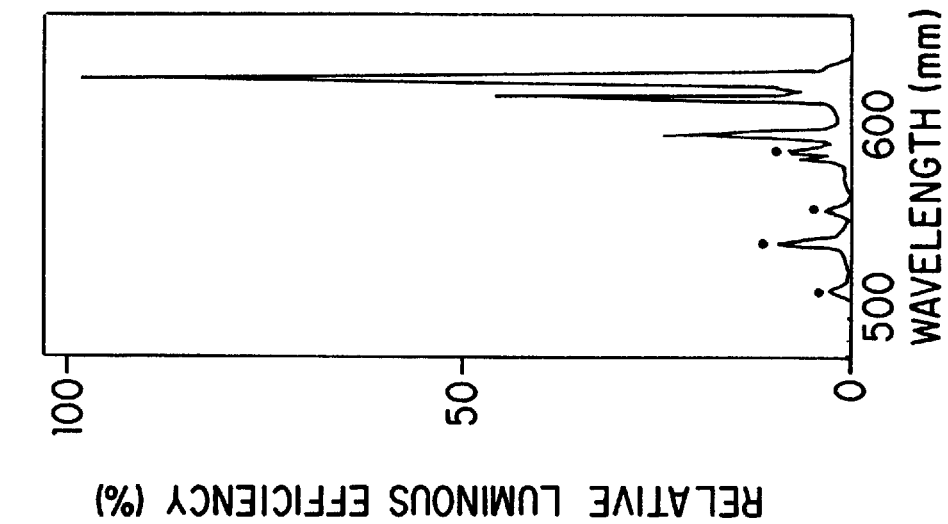
FIG. 2 is a spectrum of the red fluorescent composition with 0.07 g atomic weight/mole of europium content according to the present invention.
Figure 1:
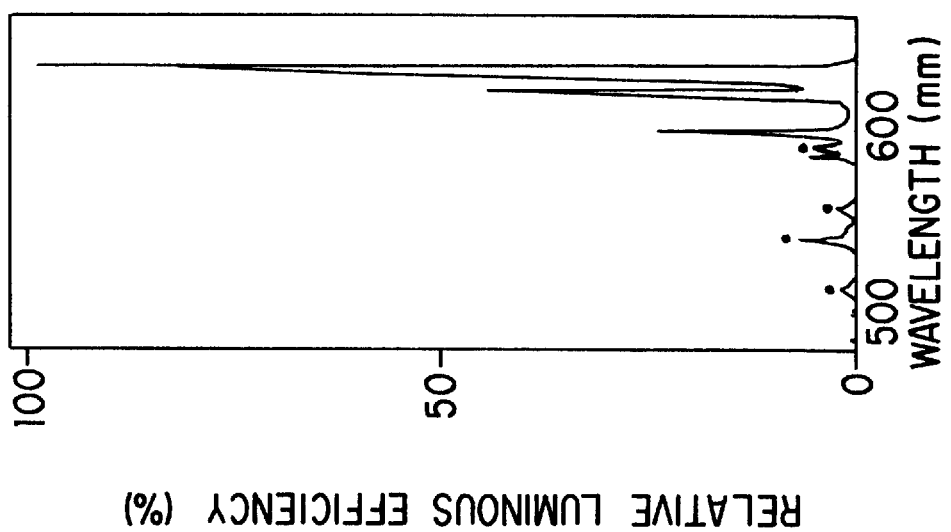
FIG. 1 is a spectrum of the red fluorescent composition with 0.08 g atomic weight/mole of europium content according to the present invention.

As shown in FIG. 1 and 2, in above europium activated yttrium oxysulfide fluorescent composition ($Y_2O_2S$:Eu), luminous wavelength in region of visible light moves towards short-wavelength as europium content relative to 1 mole of yttrium oxysulfide as a mother body increases. And as shown in Table 2 described below, the intensities of luminous peaks at 586 nm, 555 nm, 539 nm and 513 nm in region of visible light is increased compared to main luminous peak at 626 nm as europium content decreases.

TABLE 2

| Luminous wavelength (nm) | Content of Eu activator (g atmomic weight/mole) | |
| --- | --- | --- |
|  | 0.080 | 0.070 |
| 626 | 100 | 100 |
| 616 | 46.4 | 46.2 |
| 594 | 24.2 | 24.3 |
| 586 | 8.3 | 8.1 |
| 582 | 6.4 | 6.5 |
| 555 | 2.3 | 3.4 |
| 539 | 7.1 | 9.6 |
| 513 | 2.1 | 2.8 |

Therefore, as europium content decreases, x-coordinate value is decreased and y-coordinate value is increased on the chromaticity diagram in FIG. 3.

As mentioned above, in case that europium content decreases, luminous intensity in region of short-wavelength increases beyond a relatively pure red luminous region and color purity is deteriorated as a result. Hence, color purity of red fluorescent will be enhanced and the range of color reproduction will be enlarged by using europium activated yttrium oxysulfide fluorescent composition ($Y_2O_2S:Eu$) of the present invention wherein europium content is increased to 0.07–0.08 g atomic weight relative to 1 mole of yttrium oxysulfide as a mother body.

As mentioned above, however, there has been a problem that relative luminous efficiency is lowered and red monochromatic brightness is deteriorated by increasing europium content. Such problem will be solved by using the red fluorescent composition wherein a first red fluorescent with predetermined particle size and a second red fluorescent with smaller particle size are mixed. When the red fluorescent composition comprising two types of red fluorescent with different particle sizes by mixing is applied on fluorescent screen, deterioration of the luminous efficiency is prevented due to enhancement of the screen filling property.

For example, when the red fluorescent composition wherein two types of red fluorescent with a particle size of 7–8 μm and 3–5 μm respectively are mixed is used, relative luminous efficiency of dot or stripe on screen for cathode-ray tube is illustrated in Table 3 below.

TABLE 3

| Mixing ratio (A:B) | Relative luminous efficiency | | |
| --- | --- | --- | --- |
|  | 0.0070 g atomic weight | 0.075 g atomic weight | 0.080 g atomic weight |
| 100:0 | 100% | 98% | 89% |
| 80:20 | 103% | 99% | 94% |
| 60:40 | 107% | 104% | 100% |
| 50:50 | 108% | 107% | 102% |
| 40:60 | 105% | 100% | 98% |
| 20:80 | 97% | 93% | 88% |

Note) A: red fluorescent composition of the present invention having a particle size of 7–8 μm; and B: red fluorescent composition of the present invention having a particle size of 3–5 μm As mentioned above, according to the present invention, increasing the activator content of europium activated yttrium oxysulfide red fluorescent composition results in enhancement of color purity of red fluorescent and then enlargement of color reproduction range.

Further, by using the red fluorescent composition of the present invention comprising a first red fluorescent with predetermined particle size and a second red fluorescent with smaller particle size by mixing, deterioration of the luminous efficiency caused by increasing of above activator amount is prevented due to enhancement of the screen filling property.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

What is claimed is:

1. A cathode ray tube comprising green, blue and red phosphors; said red phosphor is a europium activated yttrium oxysulfide red fluorescent composition $Y_2O_2S:Eu$ having a mixture of a first red fluorescent particle with a particle size from 7–8 μm and a second red fluorescent particle with a smaller particle size of from 3–5 μm and said first red fluorescent and said second red fluorescent comprises respectively 0.07–0.08 g atomic weight of europium as an activator relative to 1 mole of yttrium oxysulfide as a mother body and a ratio of said first fluorescent to said second fluorescent is 0.25 to 4 wherein the tube has a range of color reproduction which is enlarged toward natural color.

* * * * *